(12) United States Patent
Pentek et al.

(10) Patent No.: US 8,339,734 B2
(45) Date of Patent: Dec. 25, 2012

(54) MAGNETIC WRITE HEAD HAVING A WRAP AROUND TRAILING SHIELD WITH AN ASYMETRICAL SIDE GAP

(75) Inventors: Aron Pentek, San Jose, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 293 days.

(21) Appl. No.: 12/766,764

(22) Filed: Apr. 23, 2010

(65) Prior Publication Data

US 2011/0261485 A1 Oct. 27, 2011

(51) Int. Cl.
*G11B 5/235* (2006.01)
*G11B 5/23* (2006.01)

(52) U.S. Cl. ......... 360/119.03; 360/119.04; 360/125.02; 360/125.3; 360/319

(58) Field of Classification Search ........ 360/119.01–119.04, 125.02, 319, 360/125.3
See application file for complete search history.

(56) References Cited

U.S. PATENT DOCUMENTS

| | | | |
|---|---|---|---|
| 5,075,956 A | 12/1991 | Das | 29/603 |
| 6,185,063 B1 | 2/2001 | Cameron | 360/78.04 |
| 6,967,810 B2 | 11/2005 | Kasiraj et al. | 360/78.04 |
| 7,248,431 B1 | 7/2007 | Liu et al. | 360/120 |
| 2006/0262453 A1* | 11/2006 | Mochizuki et al. | 360/125 |
| 2007/0217069 A1 | 9/2007 | Okada et al. | 360/126 |
| 2007/0268626 A1 | 11/2007 | Taguchi et al. | 360/126 |
| 2008/0144230 A1 | 6/2008 | Kaizu et al. | 360/319 |
| 2008/0180839 A1 | 7/2008 | Mochizuki et al. | 360/125.03 |
| 2009/0002896 A1* | 1/2009 | Mallary et al. | 360/319 |
| 2009/0154021 A1 | 6/2009 | Nunokawa et al. | 360/234.3 |
| 2009/0168257 A1 | 7/2009 | Hsiao et al. | 360/319 |
| 2011/0102942 A1* | 5/2011 | Bai et al. | 360/125.03 |
| 2011/0116195 A1* | 5/2011 | Cazacu et al. | 360/319 |
| 2011/0242707 A1* | 10/2011 | Yoon et al. | 360/294.1 |
| 2011/0249359 A1* | 10/2011 | Mochizuki et al. | 360/75 |
| 2011/0255196 A1* | 10/2011 | Wu et al. | 360/244.2 |

FOREIGN PATENT DOCUMENTS

| | | |
|---|---|---|
| JP | 2006/201227 | 8/2006 |
| JP | 2009/043344 | 2/2009 |
| KR | 2009/050745 | 5/2009 |

OTHER PUBLICATIONS

English-machine translation of JP2009-043344A, Tadaki et al., published on Feb. 26, 2009.*

* cited by examiner

*Primary Examiner* — Will J Klimowicz
(74) *Attorney, Agent, or Firm* — Zilka-Kotab, PC

(57) ABSTRACT

A magnetic write head having a magnetic write pole with a wrap around magnetic trailing shield. The wrap around magnetic trailing shield is separated by a first non-magnetic side gap at a first side of the write pole and by a second non-magnetic side gap at a second side of the write pole. The first second non-magnetic side gap is larger than the first non-magnetic side gap and is preferably at least twice the thickness of the first non-magnetic side gap. This design provides additional protection adjacent track interference at one side of the write pole and additional protection against magnetic write field loss at the other side of the write pole.

6 Claims, 36 Drawing Sheets

MAGNETIC WRITE HEAD HAVING A WRAP AROUND TRAILING SHIELD WITH AN ASYMETRICAL SIDE GAP

FIELD OF THE INVENTION

The present invention relates to magnetic heads for data recording, and more particularly to a magnetic write head with a wrap around trailing shield and having an asymmetrical side gap for reducing adjacent track interference on one side and reducing write field loss on the other side.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

Magnetoresistive sensors such as GMR or TMR sensors are employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soil underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic write head, a trailing magnetic shield can be used to improve the field gradient of the write field. Such trailing shields can be formed to wrap around the write pole to provide side shielding as well. The spacing between the write pole and these side portions involves a tradeoff between minimizing adjacent track writing and also minimizing write field leakage to the side shields.

SUMMARY OF THE INVENTION

The present invention provides a magnetic write head having a magnetic write pole with a wrap around magnetic trailing shield. The wrap around magnetic trailing shield is separated from the write pole by a first non-magnetic side gap at a first side of the write pole and by a second non-magnetic side gap at a second side of the write pole. The first second non-magnetic side gap is larger than the first non-magnetic side gap and is preferably at least twice the thickness of the first non-magnetic side gap. This design advantageously provides additional protection adjacent track interference at one side of the write pole and additional protection against magnetic write field loss at the other side of the write pole.

The write head can be manufactured by a process that includes forming first and second inner side walls and first and second outer side walls next to the write pole. The inner side walls can be symmetrical with one another, and likewise the outer side walls can be symmetrical to one another. Then, mask can be formed over only one of the outer side walls and a material removal process such as reactive ion etching or wet etching can be performed to remove the other outer side wall. This leaves a larger side gap thickness at one side of the write pole than at the other. A magnetic trailing wrap around shield can then be formed by a process such a electroplating.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
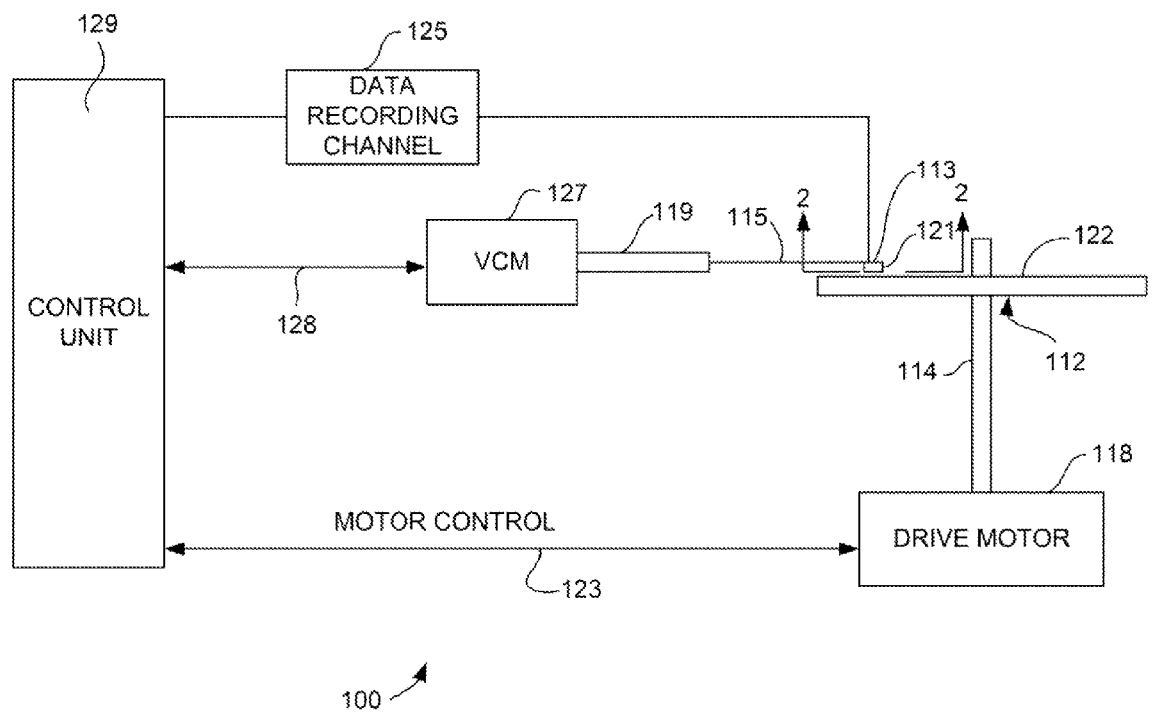
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
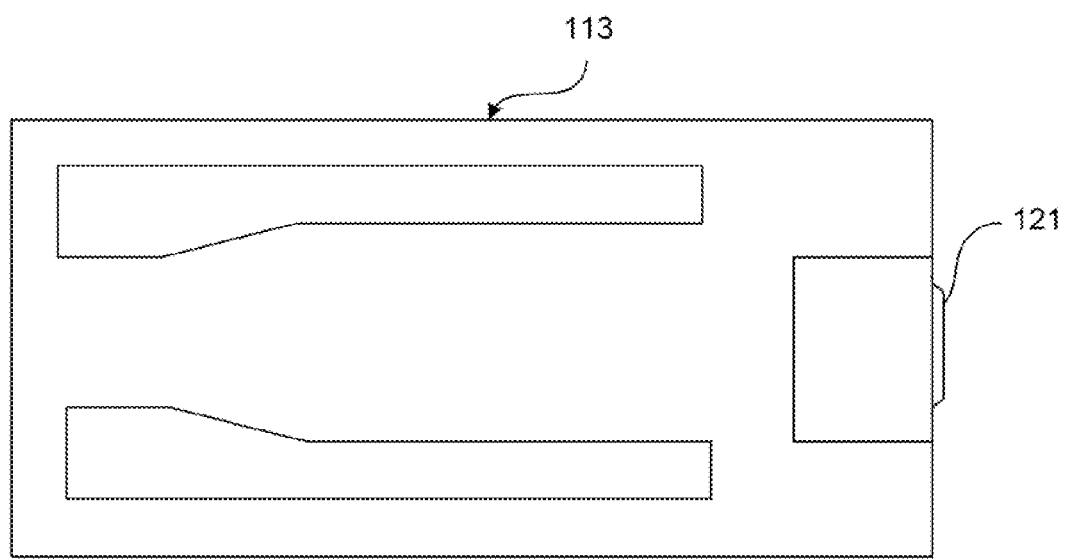
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
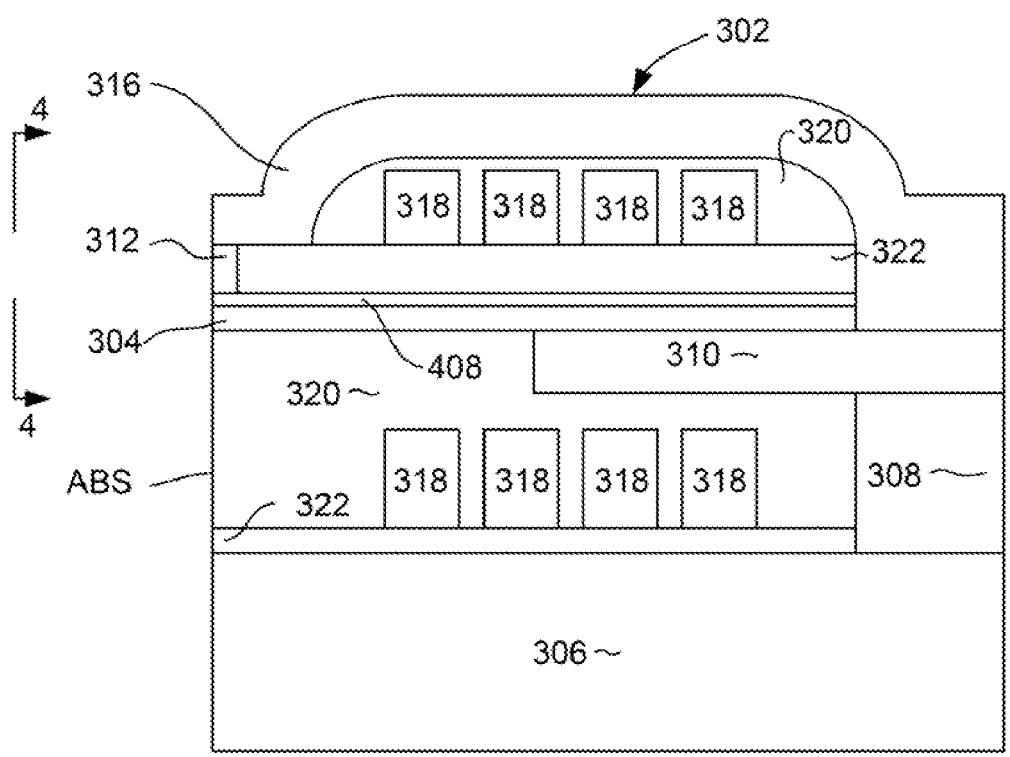
FIG. 3 is a side cross sectional view of a magnetic write head according to an embodiment of the present invention.

With reference now to FIG. 3, the invention can be embodied in a magnetic write head such as, for example; the write head 302, depicted in side cross sectional view in FIG. 3. The magnetic write head 302 includes a magnetic write pole 304 and a magnetic return pole 306. A magnetic back gap layer 308 and magnetic shaping layer 310 magnetically connect the return pole 306 with the write pole 304 at a location removed from an air bearing surface (ABS).

An electrically conductive, non-magnetic write coil 318 passes between the write pole 304 and return pole 306 and may also pass above the write pole 304. The write coil 318 can sit on top of a non-magnetic, electrically insulating material 322 and is also embedded in a non-magnetic, electrically insulating material 320 such as alumina and or hard baked photoresist.

During operation, an electrical current flowing through the coil 318 induces a magnetic field that results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby increase switching speed), the write head 302 also includes a magnetic trailing shield 312. This trailing shield 312 is separated from the write pole 304 by a non-magnetic trailing gap layer 408. The write pole 304 may also be connected with a trailing return pole 316 that connects the trailing shield 312 with the back portion of the write head 302, such as the back portion of the shaping layer 310.

Figure 4:
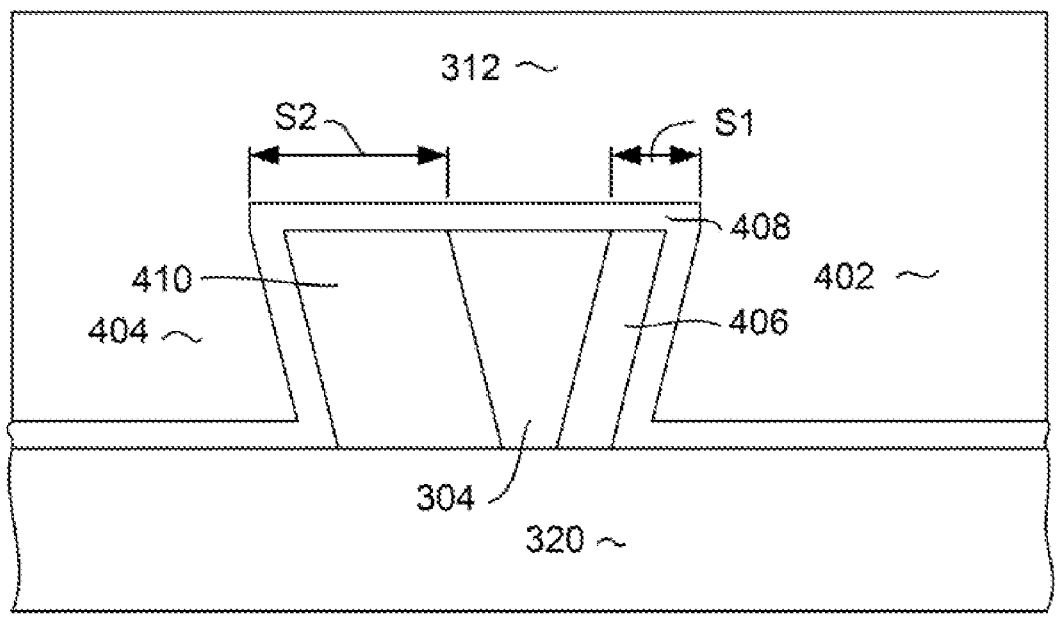
FIG. 4 is an ABS view of a portion of the write head of FIG. 3, as viewed from line 4-4 of FIG. 3.

FIG. 4 shows an ABS view of a portion of the write head 302 as seen from line 4-4 of FIG. 3. As can be seen, the trailing shield 312 is a wrap-around-trailing shield that has side portions 402, 404 that wrap around the sides of the write pole 304 to provide a side shielding function. This side shielding is useful in preventing adjacent track writing by absorbing magnetic fields that might emit from the sides of the write pole 304. The trailing portion of the write head 304 is separated from the trailing shield 312 by a non-magnetic gap layer 408, which can be a non-magnetic metal such a Ru or Rh. The side portions 402 404 of the shield 312 are separated from the write pole 304 by non-magnetic side gap layers 406, 410, and also possibly by the trailing gap layer 408 in the side region.

It has been found that adjacent track writing occurs much more readily at one side of the write head than the other. It is when designing a write head having a trailing, wrap-around shield it is desirable that the size of the non-magnetic side gap be balanced between two competing factors. The side gap should be small enough to prevent stray field from the write pole from writing to adjacent data tracks. In addition, a small side gap also improves field gradient at the track edge. On the other hand the size of the side gap should be large enough to prevent magnetic write field from leaking to the side portions of the shield (which would decrease write field strength to the media).

In order optimize both of these competing factors in a magnetic head wherein adjacent track interference occurs in an asymmetrical manner, the present invention provides a write head having asymmetrical side gaps. As seen in FIG. 4, the write head has a side gap S1 that is defined by thickness of the non-magnetic gap layer 406 (and optionally by the additional gap layer 408), and has a second gap thickness S2 that is defined by thickness of the side gap 410 (and optionally the additional gap layer 408). As can be seen, S1 is significantly smaller than S2. Preferably, S2 is at least twice S1. In this way, the additional side gap thickness S2 can be provided to reduce the amount of write field lost to the side portion 404 of the shield 312, and the smaller side gap S1 can be provided to give additional protection adjacent track writing on the side where adjacent track writing is more of a problem. Methods for manufacturing such a write head and for carefully controlling the thickness of these different side gaps S1 and S2 are described herein below.

Figure 5:
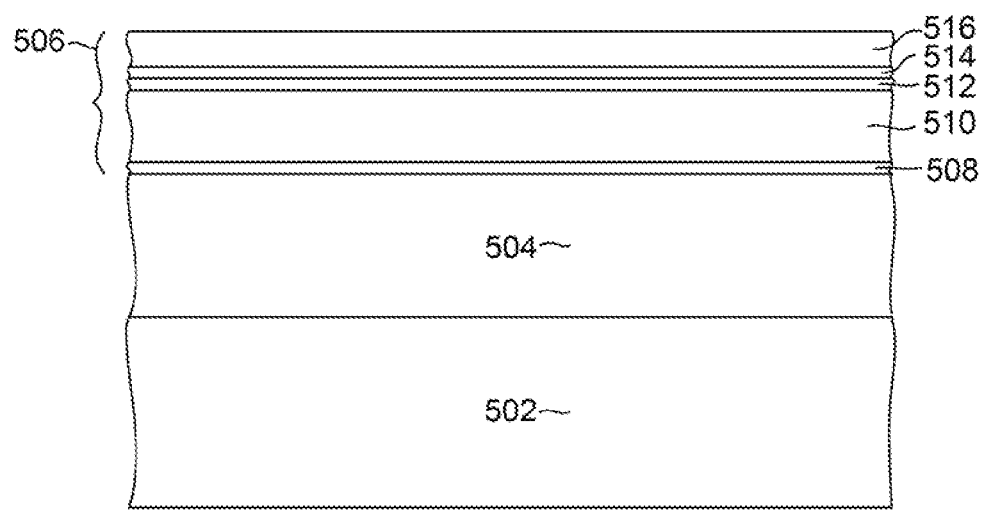
FIGS. 5-16 are views along a plane parallel with the ABS of a portion of a write head in various intermediate stages of manufacture illustrating a method of manufacturing a magnetic write head according to an embodiment of the invention.
Figure 6:
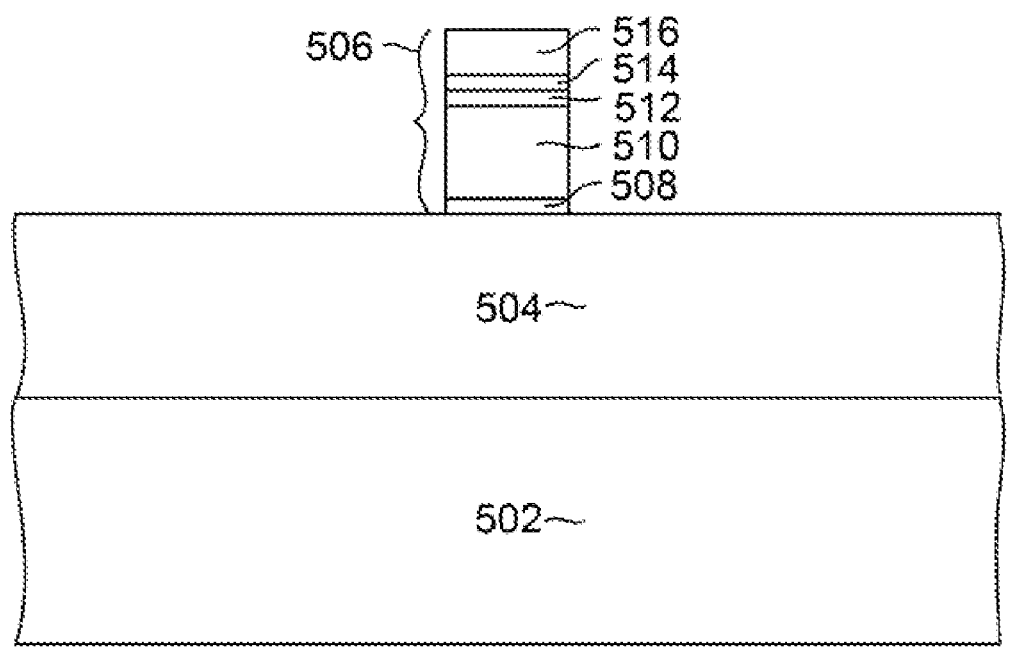

FIGS. 5-16 illustrate a method for manufacturing a write head according to a possible embodiment of the invention. With particular reference to FIG. 5, a substrate 502 is provided. This substrate 502 can include the layer 302 of FIG. 3 and also all or a portion of the shaping layer 310 of FIG. 3. A layer of magnetic write pole material 504 is deposited over the substrate 502. While the magnetic write pole layer 504 can be a single layer of high Bsat magnetic material such a CoFe, it is preferably formed as laminations of layer of high Bsat magnetic material separated by thin layer of non-magnetic material. One or more mask layers 506 are then deposited over the magnetic write pole material layer 504. While the mask layer 506 can be of various structures, the mask structure preferably includes a hard mask layer 508, which may be one or more layers of, for example alumina, diamond like carbon or some other material. An image transfer layer 510 is then deposited over the hard mask layer 508. The image transfer layer 510 can be a soluble polyimide material such as DURIMIDE®. A second hard mask (or RIE mask 512 is then deposited over the image transfer layer 510. This layer 512 can be a material such as SiO$_2$, or some other suitable material. A bottom anti-reflective coating (BARC) layer 514 is then deposited over the second hard mask layer 512. The BARC layer 514 can be a material such as DURIMIDE®. Finally, a layer of photoresist 516 is deposited over the BARC layer 514. The photoresist layer is then photolithographically patterned and developed to form a mask having a shape to define a write pole. Then a series of ion milling and reactive ion etching processes are performed to transfer the image of the photoresist mask 516 onto the underlying mask layers 514, 512, 510, 508 to form a structure such as that shown in FIG. 6.

Figure 7:
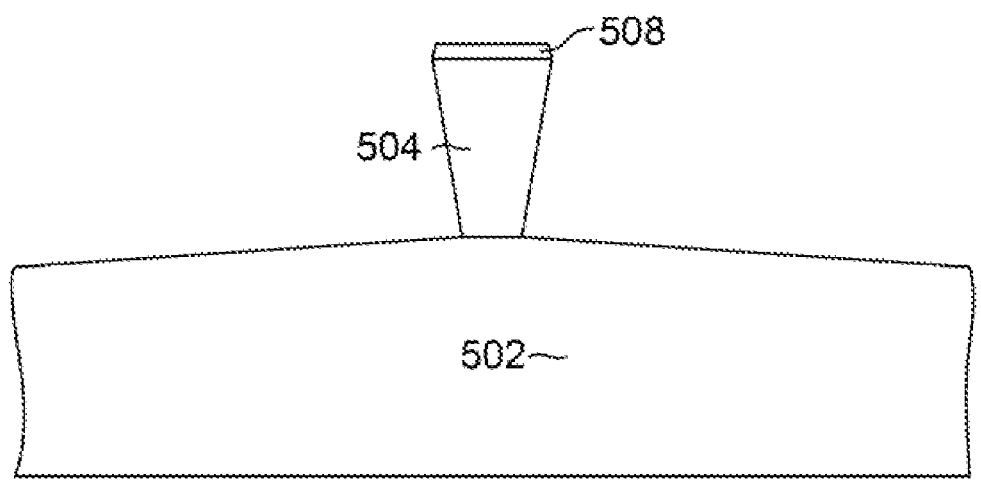

An ion milling process can then be performed to remove portions of the write pole material 504 that are not protected by the mask 506, leaving a structure such as that shown in FIG. 7. The ion milling process can be performed at one or more angles relative to normal in order to form the write pole material 504 with a trapezoidal shape having tapered side walls as shown in FIG. 7. The ion milling process may also remove many of the layers of the mask 506 (FIG. 6) and may leave only the hard mask layer 508 after ion milling, as shown in FIG. 7. Masking layers not removed by the ion mill can be stripped using NMP or O$_2$ RIE.

Figure 8:
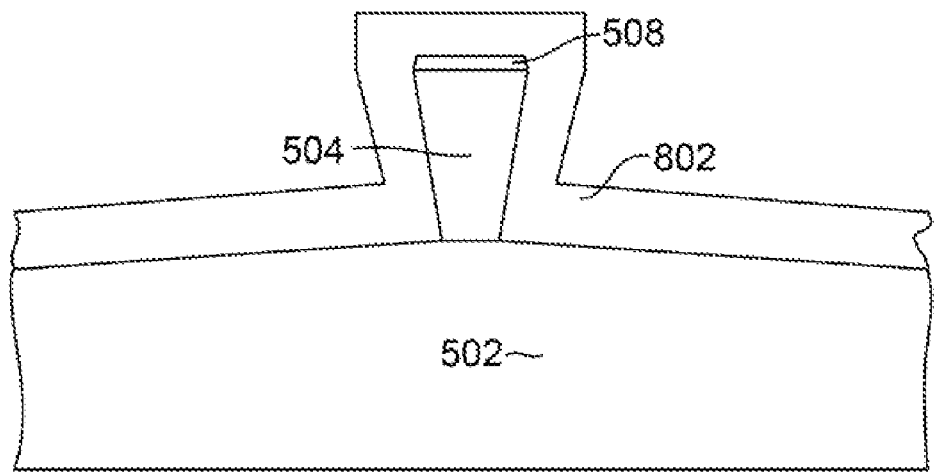

Then, as shown in FIG. 8, a layer of non-magnetic material 802 can be deposited. This layer 802 can be a first layer of alumina deposited by a conformal material deposition process such as atomic layer deposition (ALD). The ALD layer 802 is preferably deposited to a thickness of 30-90 nm.

Figure 9:
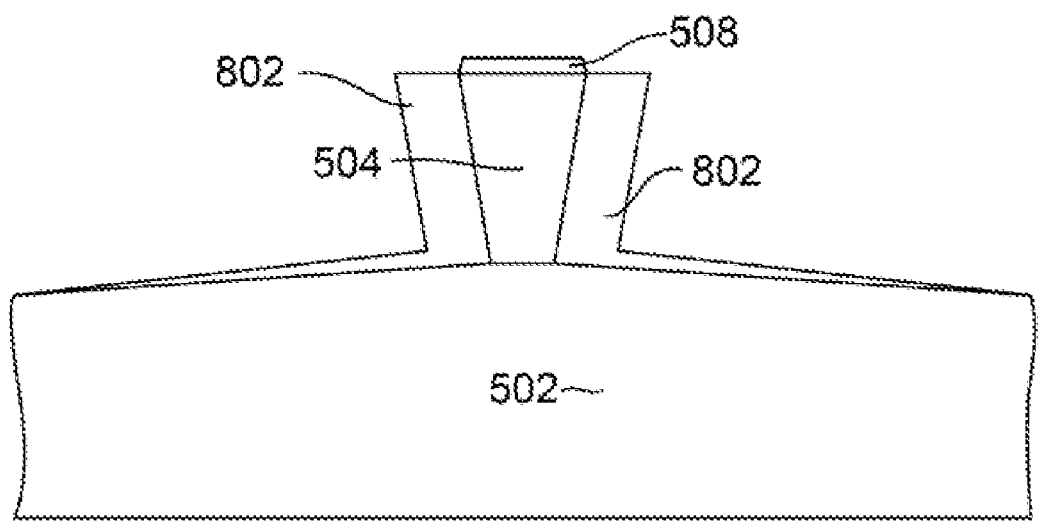
Figure 10:
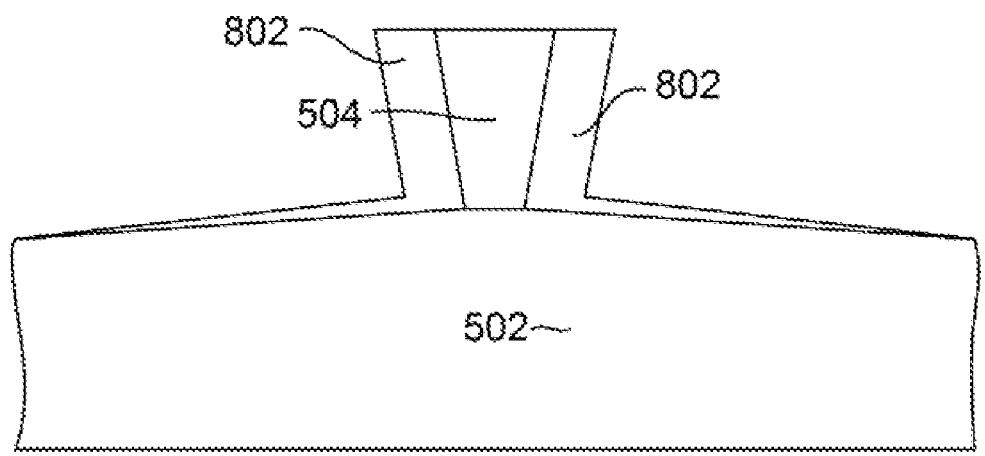

An ion milling is then performed to preferentially remove horizontally disposed portions of the ALD layer 802 to from a first (or inner) set of non-magnetic side gap walls 802 as shown in FIG. 9. A reactive ion etching can then be performed to remove the remaining hard mask 508, leaving a structure such as that shown in FIG. 10.

Figure 11:
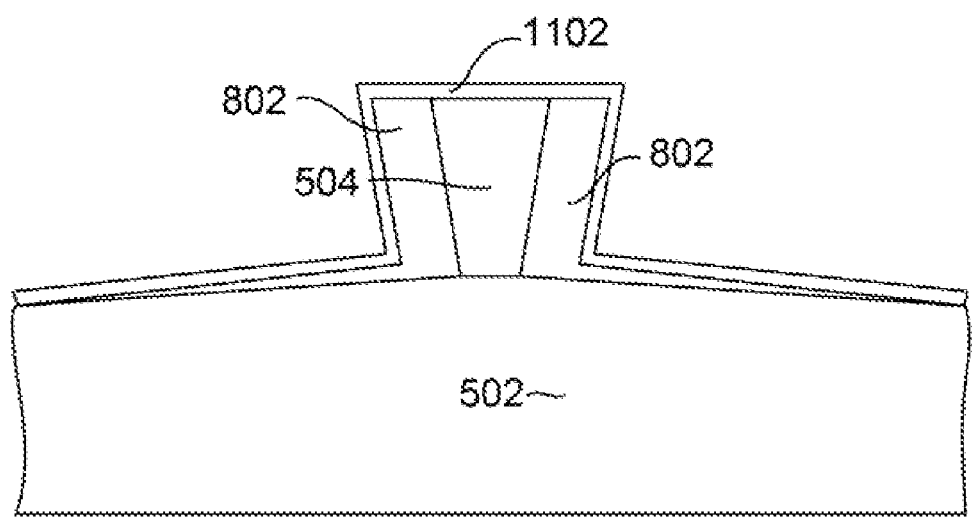
Figure 12:
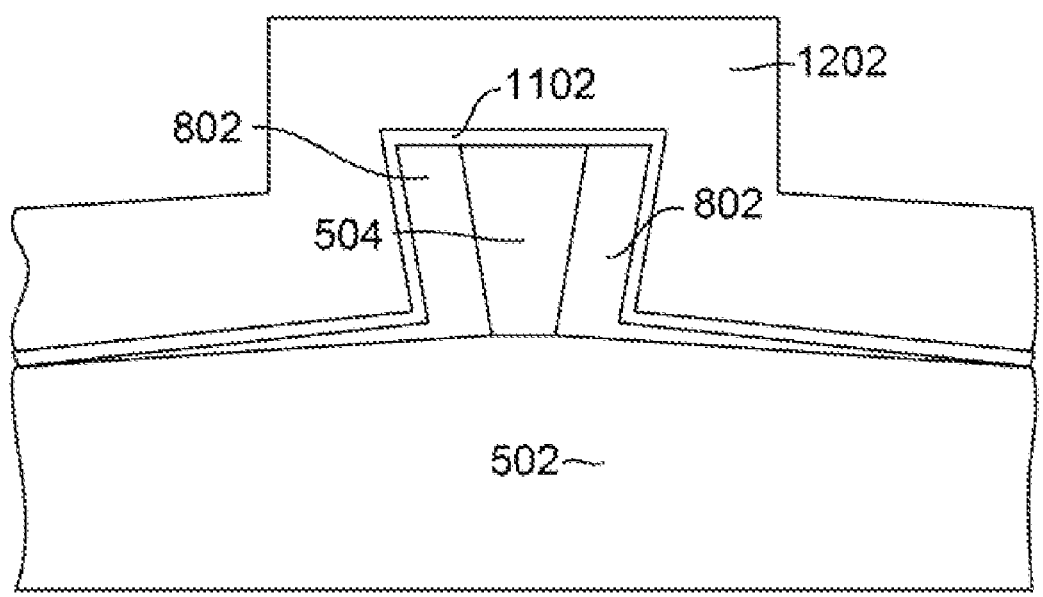
Figure 13:
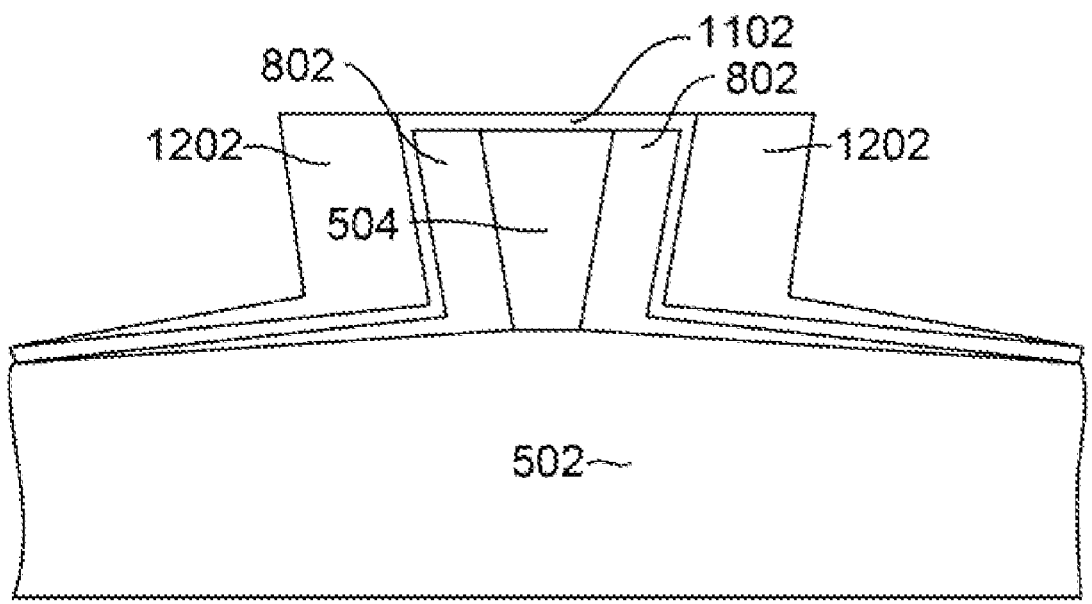

Then, with reference to FIG. 11, a non-magnetic trailing gap layer 1102 is deposited. This layer 1102 can be constructed of, for example, Ru or Rh, and is deposited to a thickness that is chosen to define a trailing gap thickness. Then, another thick layer of non-magnetic material 1202 is deposited. Like the other layer 802, this layer can also be constructed of alumina deposited by a conformal deposition process such as Atomic Layer Deposition (ALD). This second ALD layer 1202 can be deposited to a thickness of 60-200 nm. Another ion milling can then be performed to preferentially remove horizontally disposed portions of the second ALD layer 1202, stopping when the metal gap layer 1102 has been exposed, as shown in FIG. 13. This results in a second (outer) set of side walls 1202 being formed. As can be seen, the first set of side walls 802 is separated from the second set of side walls 1202 by the non-magnetic metal gap layer 1102.

Figure 14:
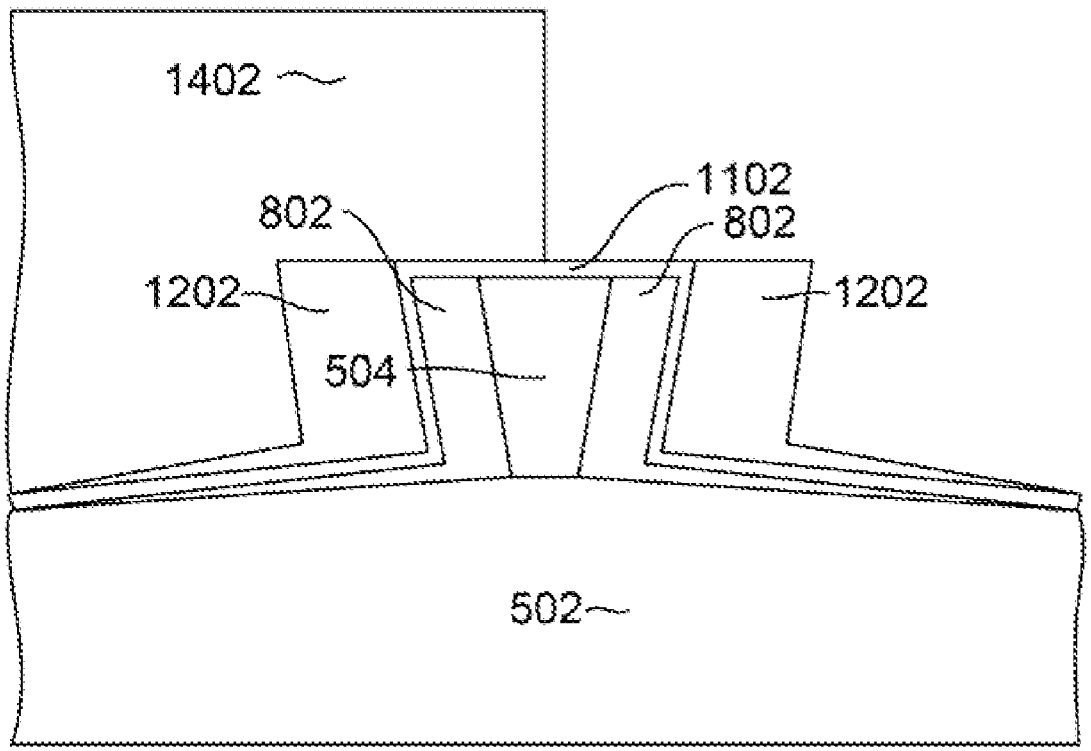
Figure 15:
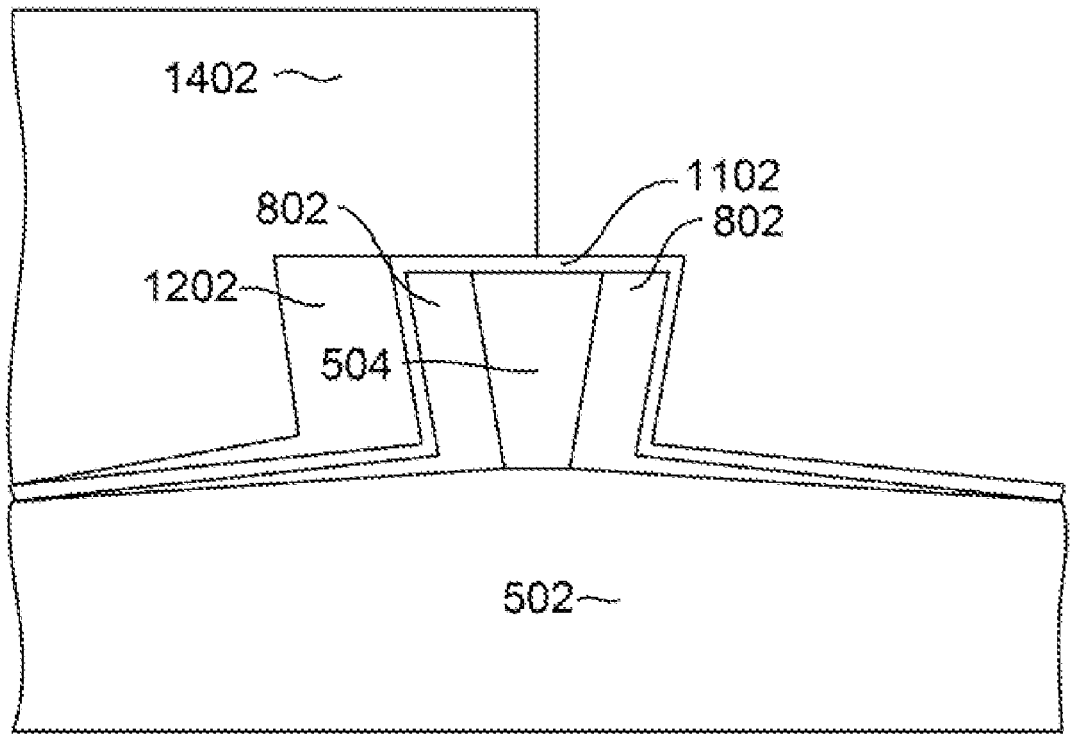
Figure 16:
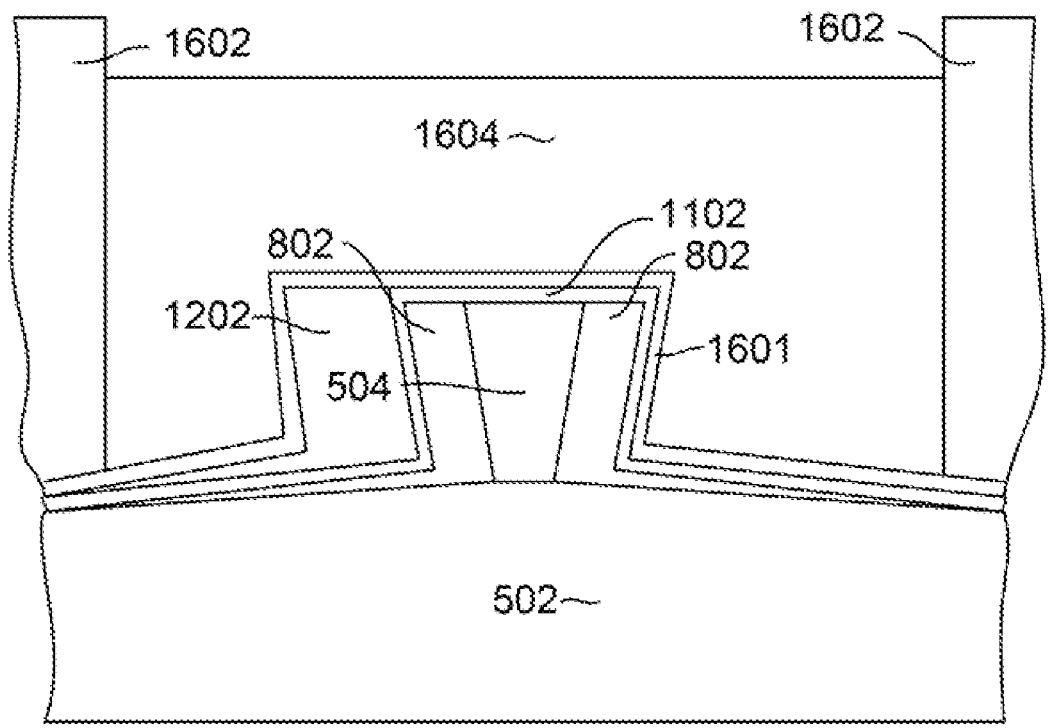

Then, with reference to FIG. 14, a photoresist mask structure 1402 is formed so as to cover one side of the structure while leaving the other half uncovered. Therefore, one of the outer side gap layers 1202(a) is covered by the mask 1402, while the other side gap layer 1202(b) is not. Then, a Reactive Ion Etching (RIE) or a wet etch process is performed to remove the exposed outer side wall 1202(b), leaving a structure such as that shown in FIG. 15. The photoresist mask 1402 can then be removed. A magnetic electrically conductive seed layer 1401 is deposited. This seed layer can be CoFe or CoFeNi alloy. Then, another mask structure can be 1602 formed such as shown in FIG. 16 to provide an electroplating frame mask. The electroplating frame mask 1602 is formed with an opening that is configured to define a trailing magnetic shield. A magnetic material 1604 can then be electroplated into the opening to define a trailing-wrap-around magnetic shield.

Figure 17:
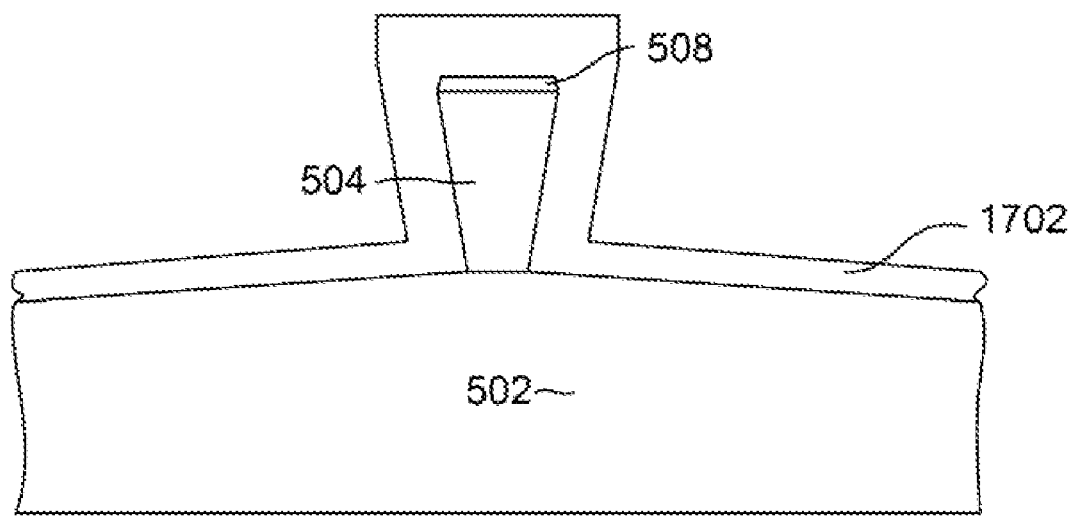
FIGS. 17-23 are views along a plane parallel with the ABS of a portion of a write head in various intermediate stages of manufacture illustrating a method of manufacturing a magnetic write head according to an alternate embodiment of the invention.

FIGS. 17-23 illustrate an alternative method for constructing a magnetic write pole having a trailing-wrap-around magnetic shield with asymmetrical side gaps. Starting with a structure such as that described above with reference to FIG. 7, a layer of non-magnetic metal 1702 is deposited, as shown in FIG. 17. This non-magnetic metal is preferably a material that is resistant to a material removal process that can be used to remove alumina, for reasons that will become apparent below. The non-magnetic metal 1702 is preferably Ru and is preferably deposited by atomic vapor deposition to a thickness of 30-60 nm.

Figure 18:
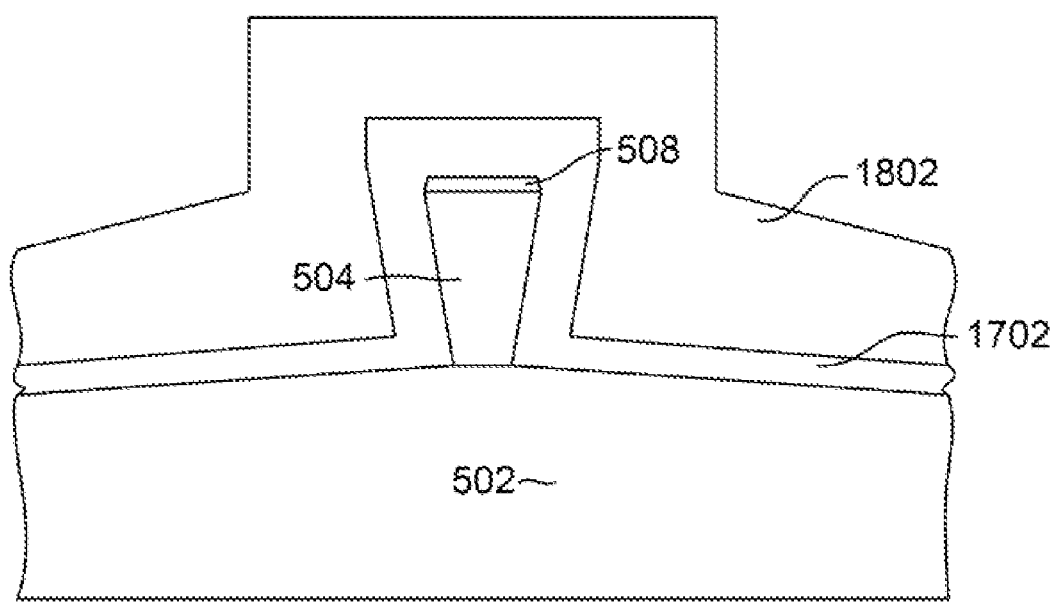
Figure 19:
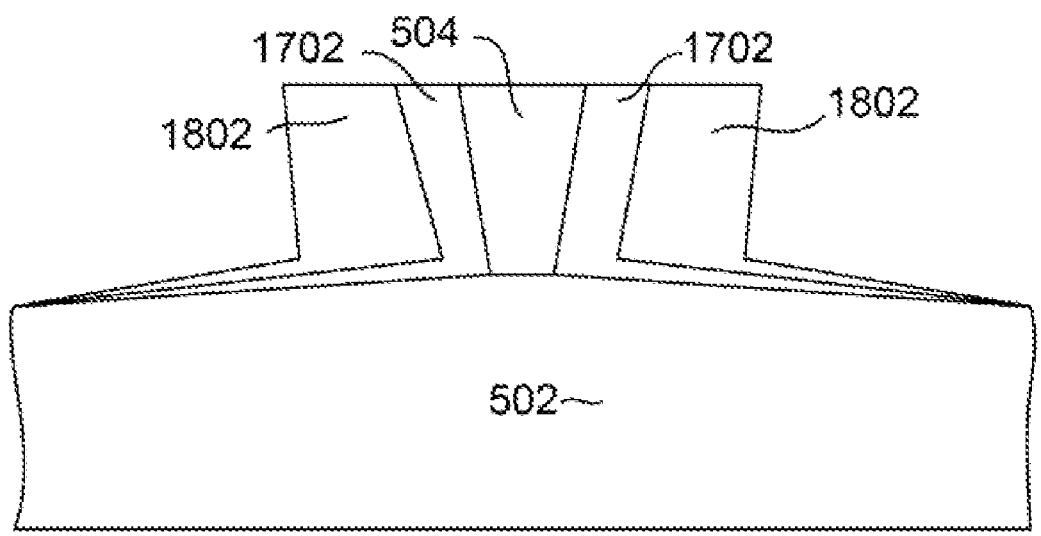

Then, with reference to FIG. 18 a layer of alumina 1802 is deposited, preferably by atomic layer deposition. This alumina layer 1802 is preferably deposited to a thickness of 60-200 nm. An ion milling is then performed to a portion of the layers 1802, 1702, using an end point detection scheme to terminate ion milling when the hard mask 508 has been reached. Then a reactive ion etching (RIE) can be performed to remove the remaining hard mask 508, leaving a structure such as that shown in FIG. 19.

Figure 20:
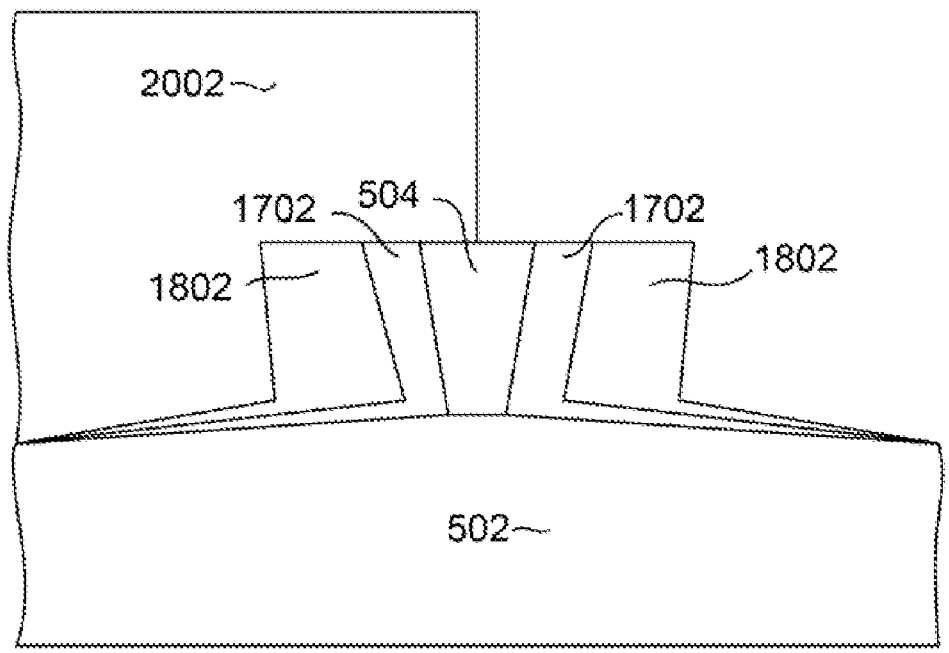
Figure 21:
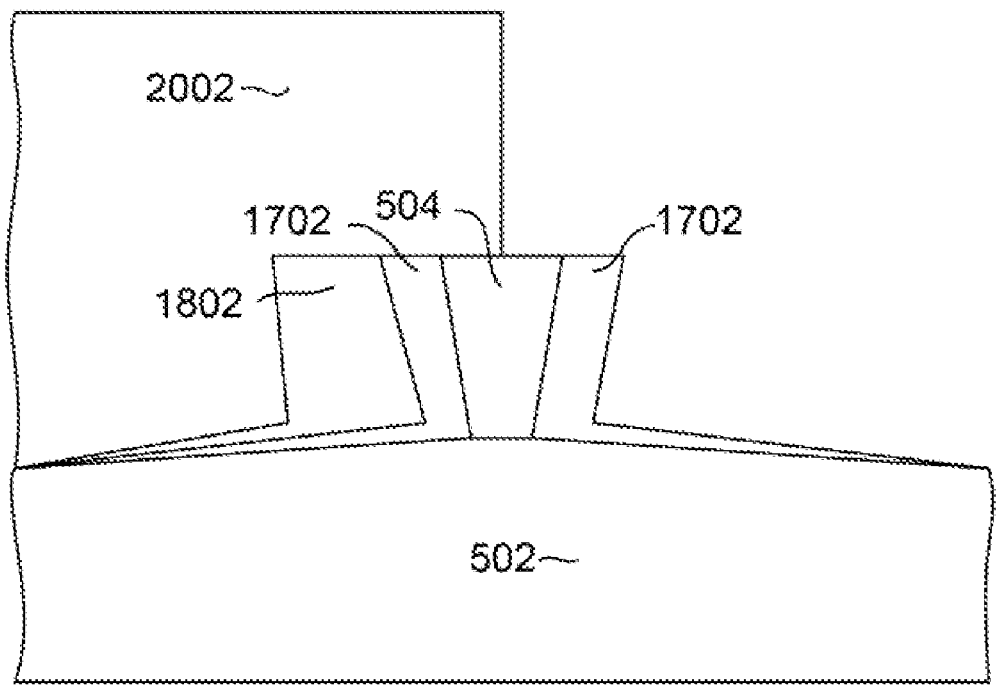
Figure 22:
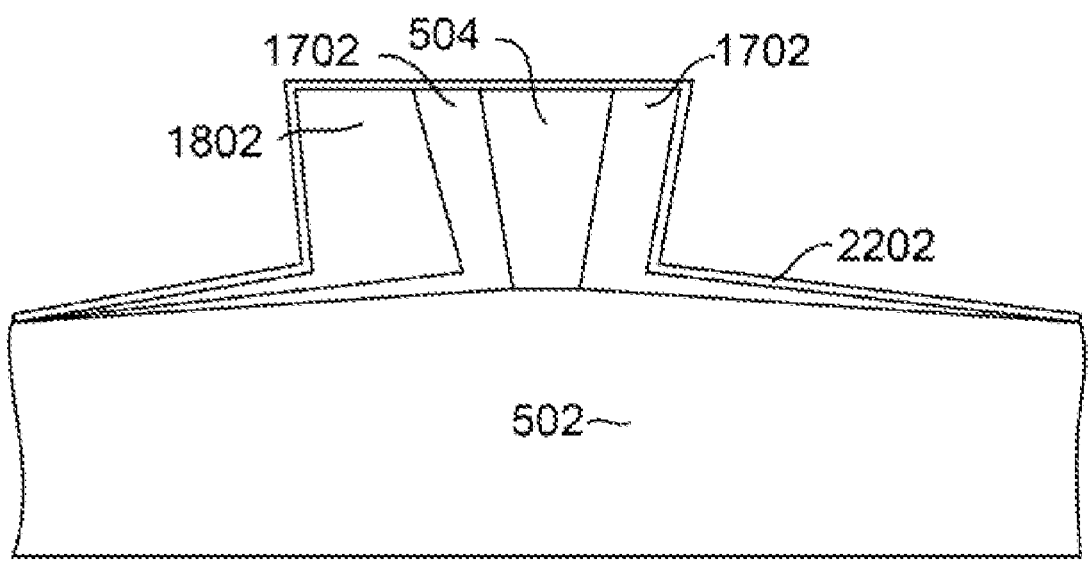

Then, with reference to FIG. 20, a mask structure 2002 is formed so as to cover half of the structure thus formed, leaving the other half uncovered. A reactive ion material removal process can then be performed to remove exposed portions of the alumina layer 1802, leaving a structure such as that shown in FIG. 21. The material removal process can be a reactive ion etching performed in a chlorine chemistry or can be a wet etch designed to remove alumina.

Figure 23:
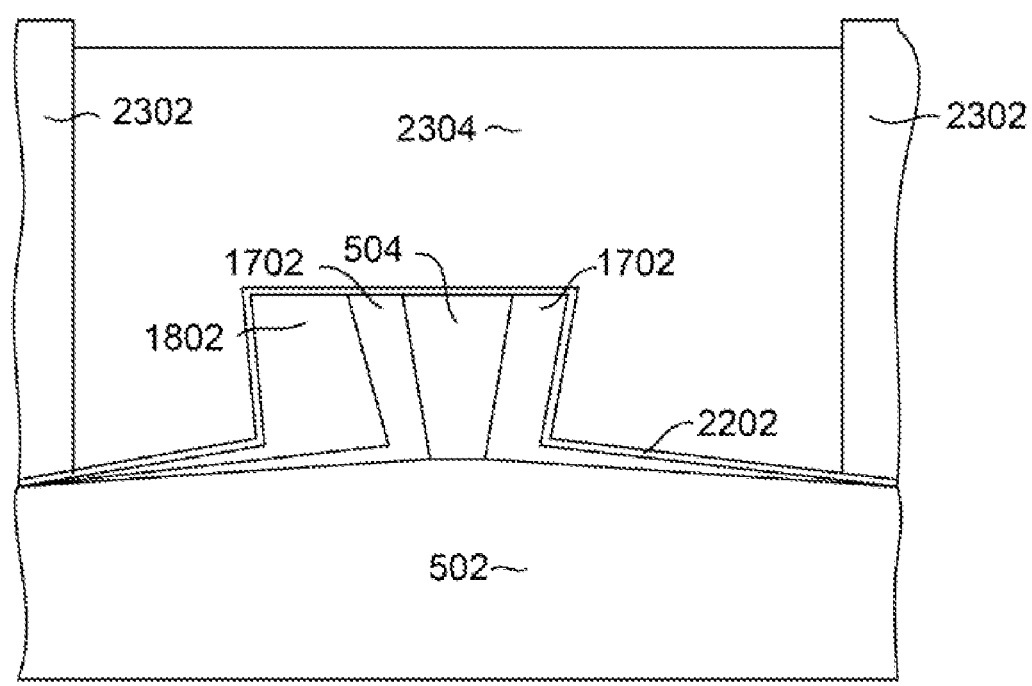

The mask 2002 can then be removed and a thin layer of non-magnetic metal such as Ru or Rh 2202 can be deposited to a thickness chosen to define a trailing gap thickness. Then, as shown in FIG. 23, an electroplating frame mask 2302 can be formed having opening configured to define a trailing-wrap-around magnetic shield as shown in FIG. 23. A magnetic material 2304 can then be electroplated into the opening to form a trailing-wrap-around magnetic shield. The underlying metal gap layer 2202 can be used as an electroplating seed.

Figure 24:
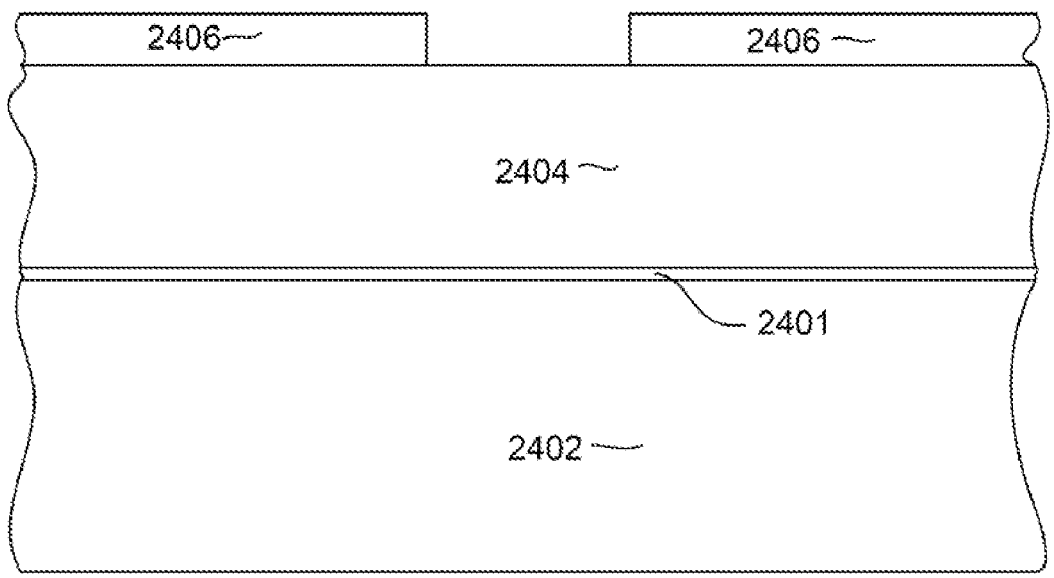
FIGS. 24-35 are views along a plane parallel with the ABS of a portion of a write head in various intermediate stages of manufacture illustrating a method of manufacturing a magnetic write head according to yet another embodiment of the invention.

FIGS. 24-35 illustrate yet another possible method for manufacturing a magnetic write head according to an embodiment of the invention, wherein the write pole is formed by a damascene process. With particular reference to FIG. 24, a substrate 2402 is provided. Again this substrate 2402 can be a portion of the non-magnetic layer 320 and shaping layer 310. A RIE stop layer 2401 is deposited over the substrate 2402. The RIE stop layer can be a material such as Cr, NiCr, or Ru. A RIEable fill layer 2404 is deposited over the RIE stop layer 2401. The RIEable fill layer can be a material such as $Al_2O_3$, $SiO_2$ and is deposited to a thickness that is at least as thick as a desired finished write pole. Then, a metal mask 2406 is formed over the RIEable fill layer 2404, the mask having an opening configured to define a write pole, but slightly larger than the write pole for reasons that will become apparent below. This metal mask can be formed by a traditional liftoff or other method well known to those skilled in the art. The metal mask can be a material such as NiCr that has a high RIE selectivity to the RIEable fill layer.

Figure 25:
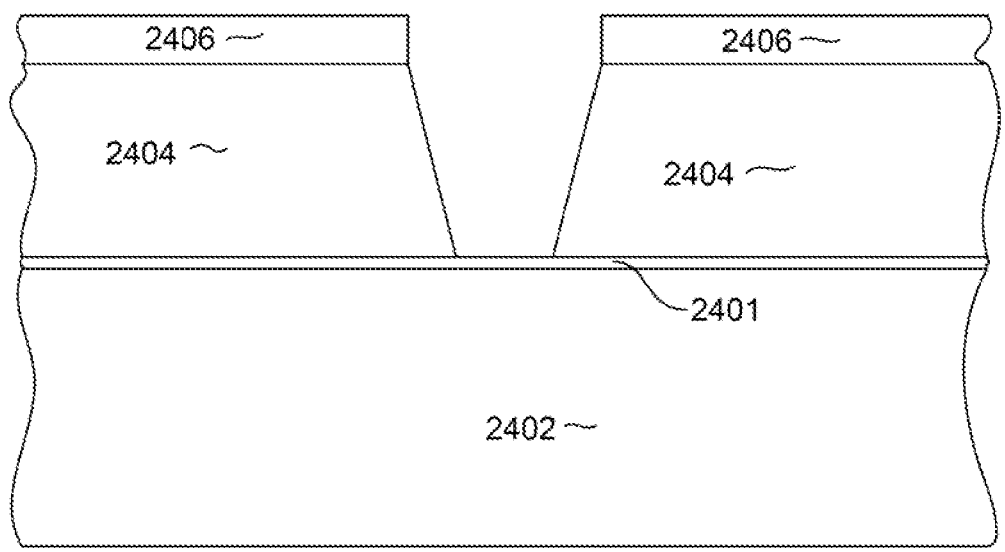
Figure 26:
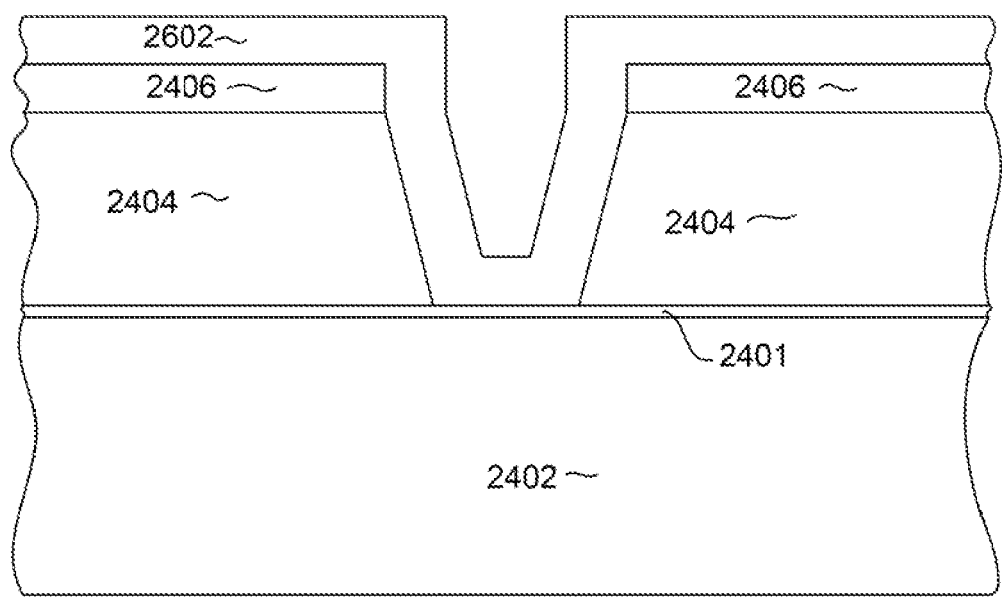
Figure 27:
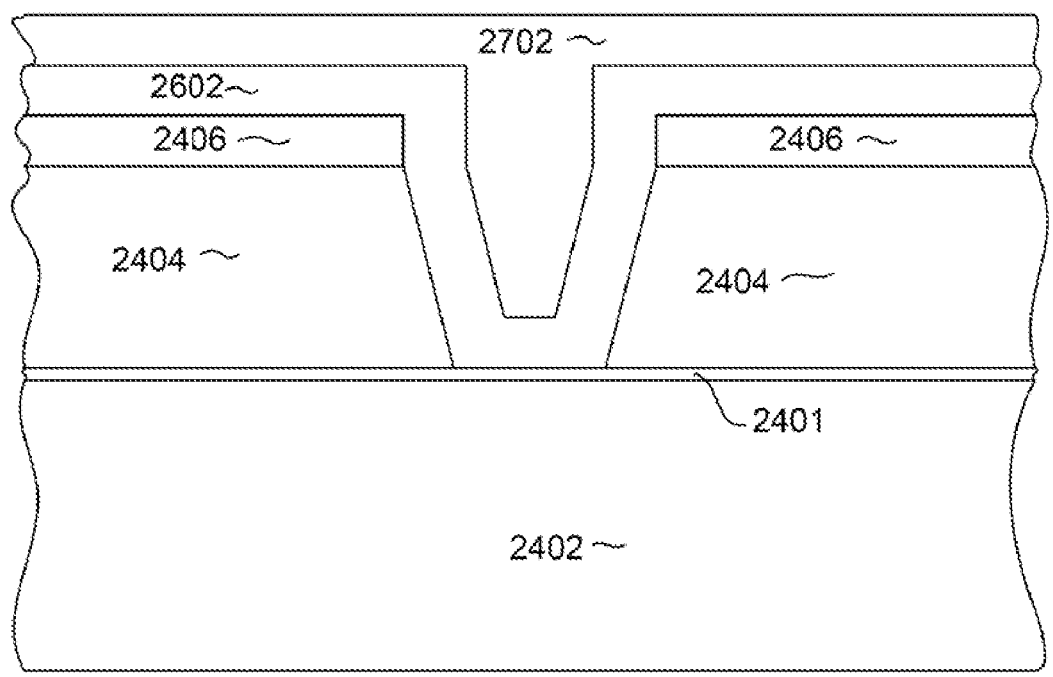
Figure 28:
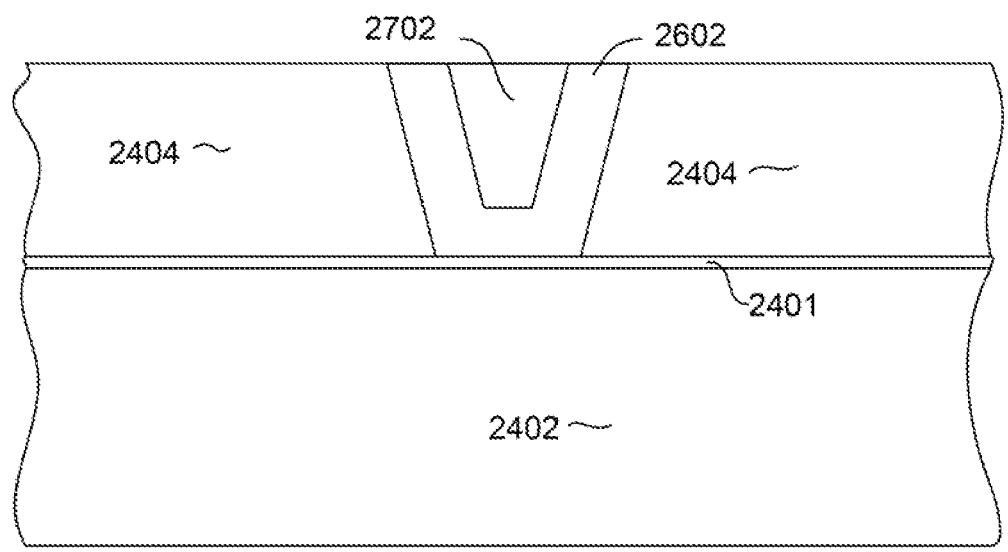

With reference now to FIG. 25, a Reactive Ion Etching (RIE) is performed to remove portions of the RIEable fill layer 2404 that are exposed by the opening in the mask 2406. The RIE can be performed in such a manner as to form an opening with tapered side walls in the fill layer 2404. A layer of non-magnetic material 1602 is deposited to reduce the width of the opening. The non-magnetic material 1602 can be Ru and is preferably deposited by atomic vapor deposition to a thickness of 30-60 nm. This reduces the track width of the sensor, as will be seen. A magnetic material can then be electroplated into the opening to form a write pole 1702, using the non-magnetic layer 2602 as an electroplating seed and leaving a structure such as that shown in FIG. 27. A chemical mechanical polishing and ion milling can then be performed to form a structure such as that shown in FIG. 28, where the fill layer 2404 is exposed at the sides of the write pole 2702.

Figure 29:
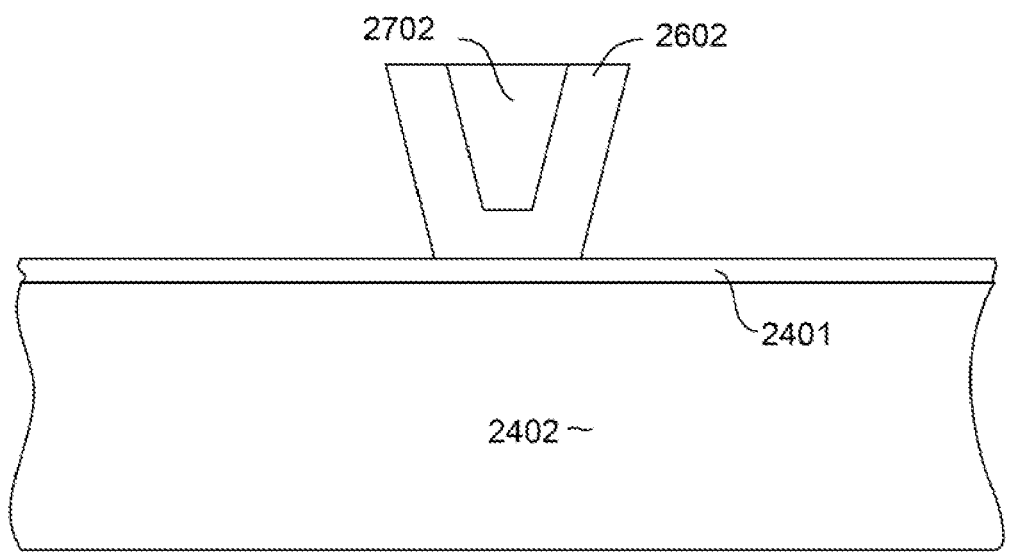
Figure 30:
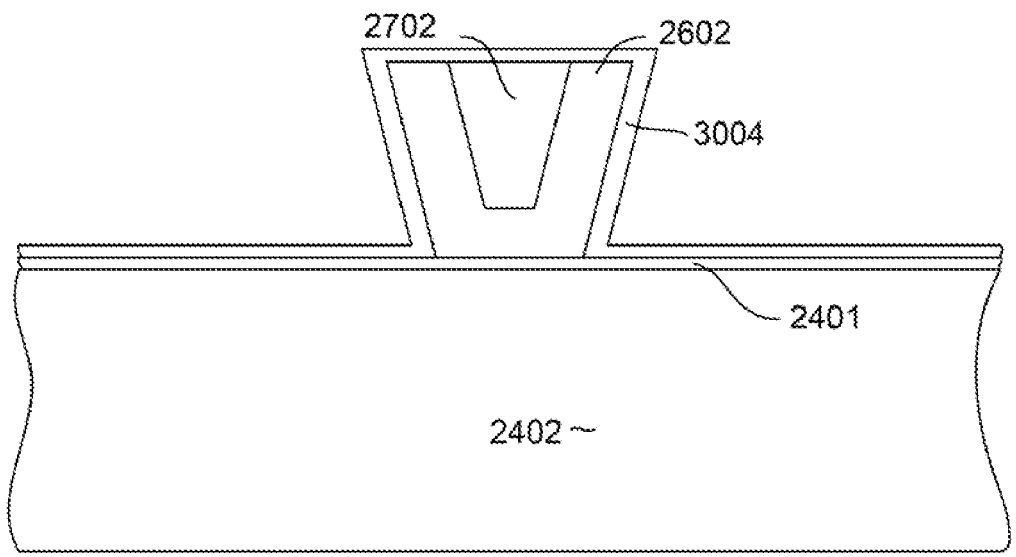

A reactive ion etching can then be performed to remove the remaining RIEable fill layer, leaving a structure such as that shown in FIG. 29. Alternatively a wet etch can also be used to remove the fill layer 2404. Then, as shown in FIG. 30, an additional layer of non-magnetic material 3004 such as Ru can be deposited to provide additional width to the inner side walls formed by the layers 2602, and to provide an end point detection layer of a subsequent ion milling process. This additional layer 3004 can be Ru deposited by atomic vapor deposition and can be deposited to a thickness of anywhere from 0-40 nm, depending upon design requirements. It should also be pointed, however, out that the deposition of this additional layer 3004 is optional.

Figure 31:
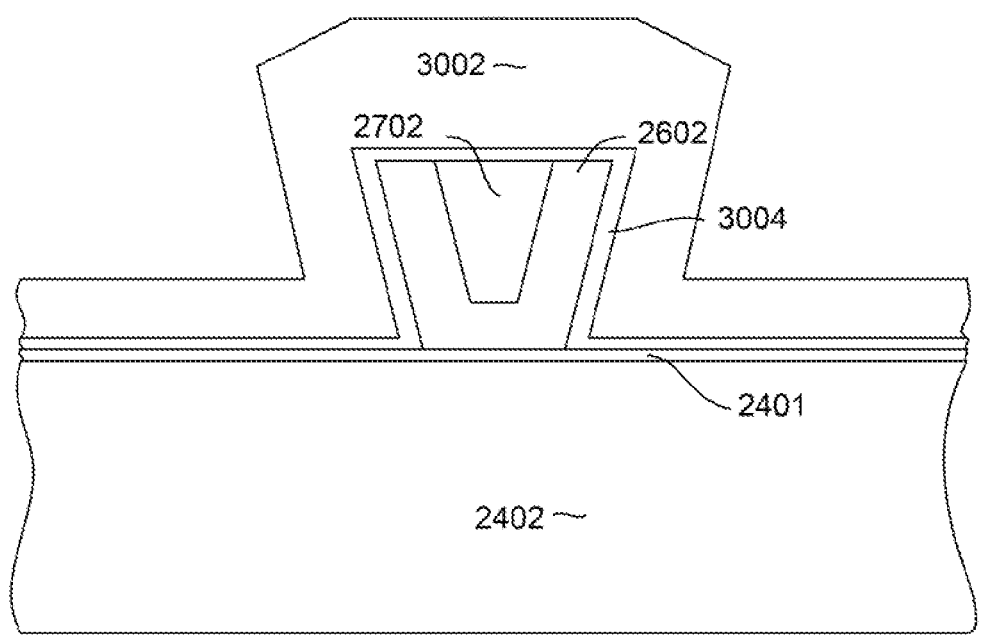
Figure 32:
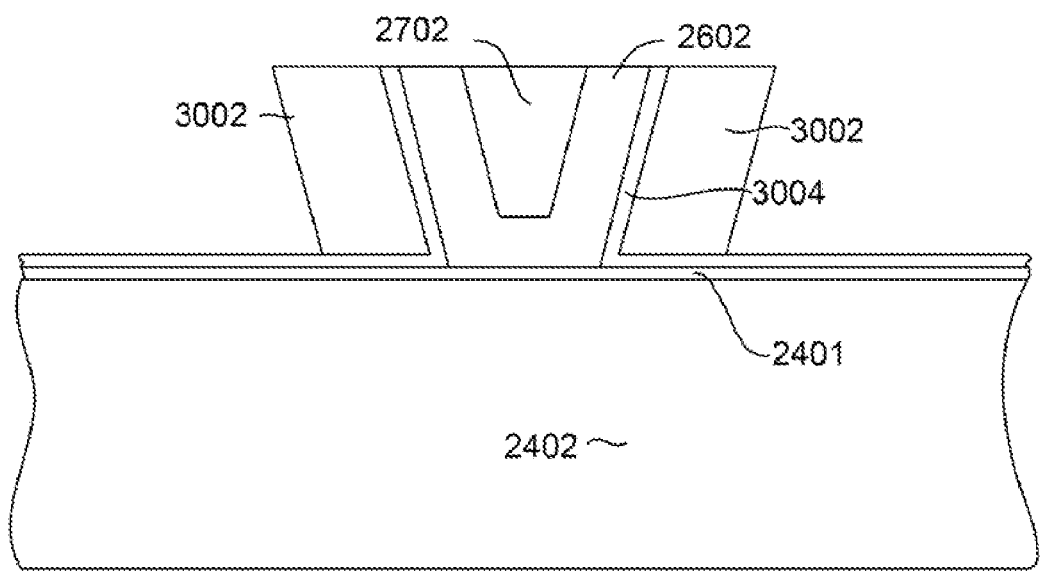

With reference now to FIG. 31 a thicker layer of alumina 3102 is deposited, preferably by atomic layer deposition (ALD). This layer can be deposited to a thickness of 60-200 nm. An ion milling is then performed using the Ru layer 3004 as an end point detection layer. The ion milling therefore, stops when the Ru layer 3004 has been removed. This leaves a structure such as that shown in FIG. 32.

Figure 33:
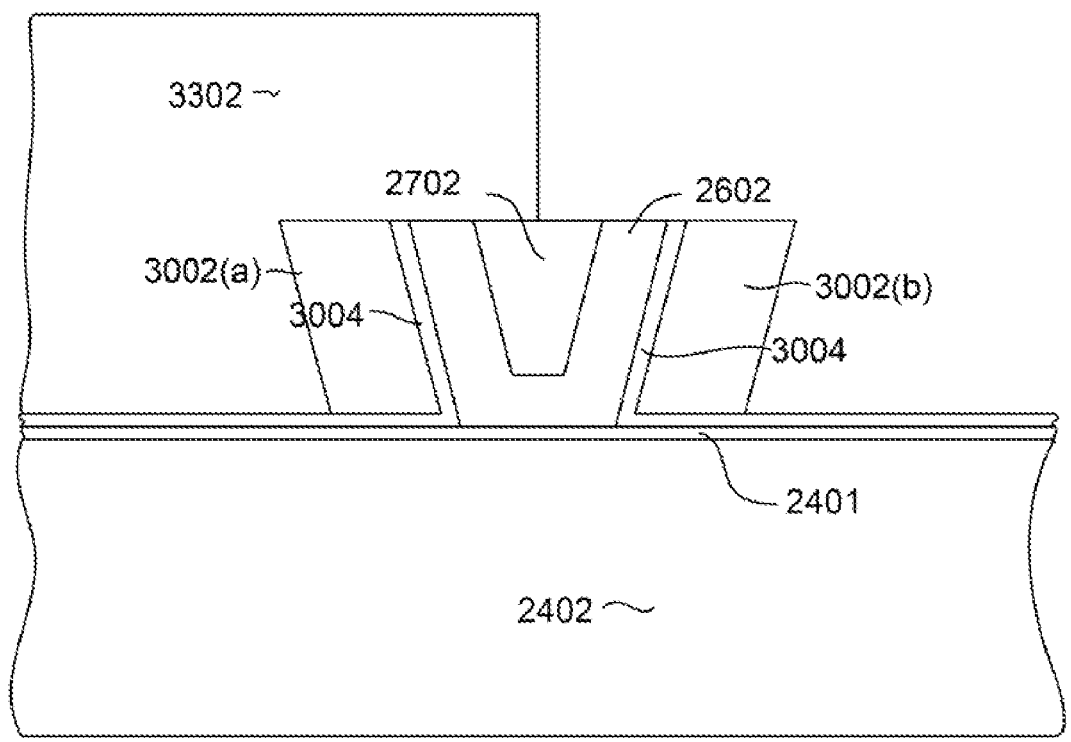
Figure 34:
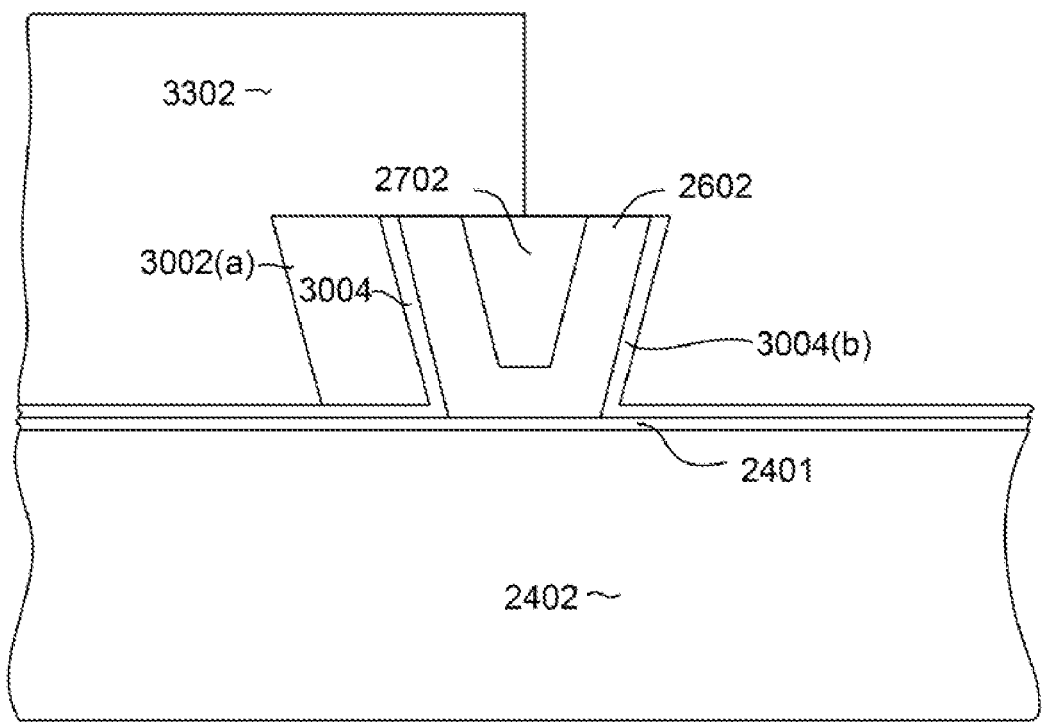
Figure 35:
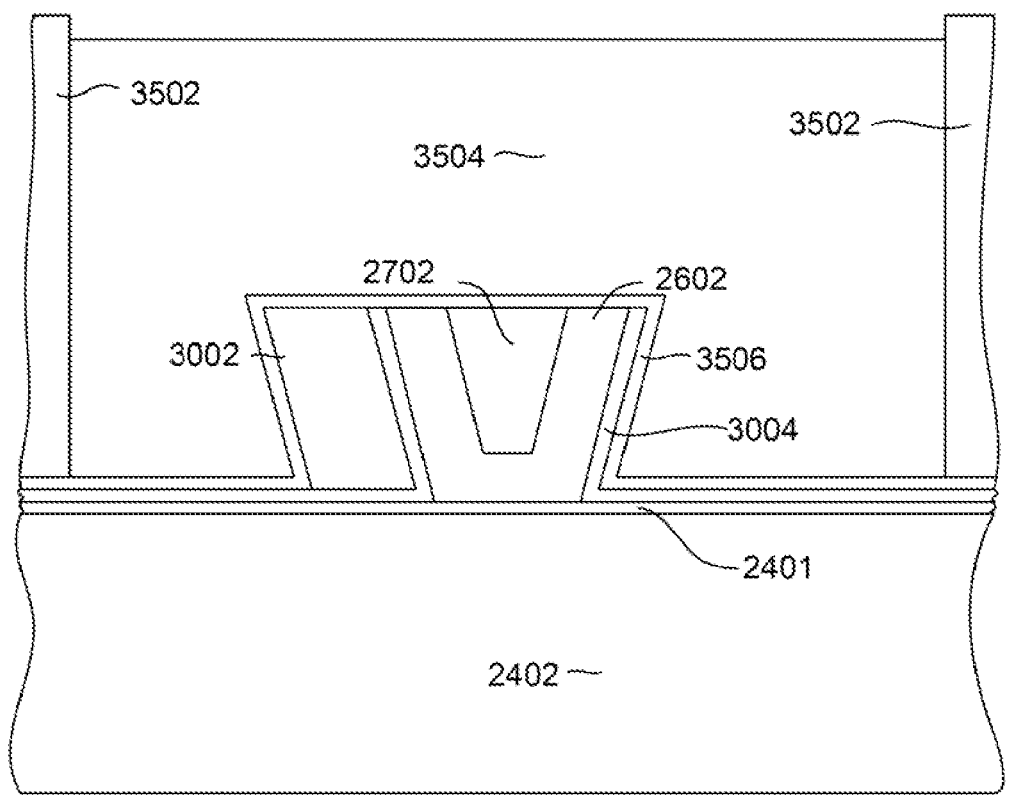

Then, with reference to FIG. 33 a mask is formed over one side of the write pole and side gap layers 3702, 2602, 3004, 3002, leaving the other side uncovered. Then, a reactive ion etching is performed to remove the exposed outer gap layer 3002(*b*) (FIG. 33) leaving the covered outer layer 3002(*a*) intact as shown in FIG. 34. Alternatively, a wet etch process could also be used to remove the exposed outer gap layer 3002(*b*). Then, with reference to FIG. 35, a non-magnetic, electrically conductive seed layer 3506 is deposited to provide a trailing gap layer as well as an electroplating seed. A layer of magnetic material 3504 is then electroplated to form a trailing-wrap-around magnetic shield.

As mentioned above, the use of an asymmetrical wrap-around-trailing shield can be advantageous in certain magnetic data recording systems. One such system in which an asymmetrical wrap-around-trailing shield can be particularly advantageous is a system wherein data track intentionally overlap one another, also referred to as a "shingle" recording system.

Figure 36:
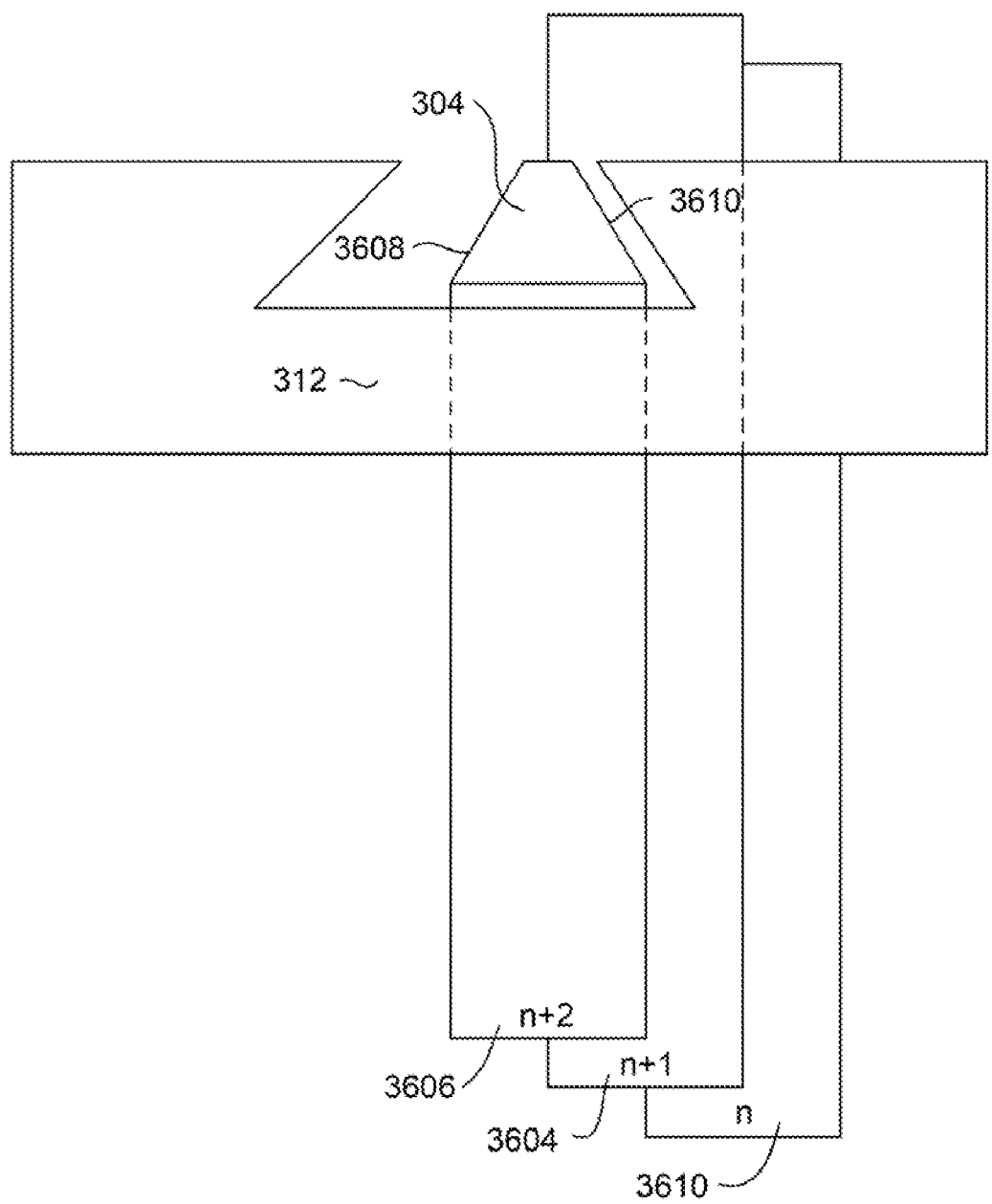
FIG. 36 is a schematic view illustrating the implementation of an embodiment of the invention in a data recording system in which data tracks overlap one another.

The use of an asymmetrical wrap-around-trailing shield in such a shingle recording system can be better understood with reference to FIG. 36. As seen in FIG. 36, a write pole 304 records tracks of data (n) 3602, (n+1) 3604, (n+2) 3606 etc. that overlap one another. Overlapping the data tracks in this manner achieves a significant increase in data track density, thereby improving data density. The writing occurs at the trailing edge of the write pole 304 and occurs more significantly at one side 3608 of the write pole 304 than at the other side 3610.

The use of an asymmetrical wrap-around-trailing shield 312 can help to facilitate recording in such a shingle recording system by increasing side shielding at one side 3610 of the write pole (thereby minimizing the write of data to adjacent tracks (e.g. n+1, 3604) and also maximizing the write field and write field gradient at the other side 3608 of the write pole 304.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head comprising:
a magnetic write pole having first and second laterally opposed sides and a trailing edge;
a trailing wrap around shield having a trailing portion that is separated from the trailing edge of the write pole by a non-magnetic trailing gap and having first and second side portions, the first side portion being separated from the first side of the write pole by a first side gap having a thickmess S1 and the second side portion being separated from the second side of the write pole by a second side gap having a thickness S2, wherein S2 is greater than S1;
wherein the first side gap includes a single layer of alumina and the second side gap includes two layers of alumina.

2. A magnetic write head comprising:
a magnetic write pole having first and second laterally opposed sides and a trailing edge;
a trailing wrap around shield having a trailing portion that is separated from the trailing edge of the write pole by a non-magnetic trailing gap and having first and second side portions, the first side portion being separated from the first side of the write pole by a first side gap having a thickness S1 and the second side portion being separated from the second side of the write pole by a second side gap having a thickness S2, wherein S2 is greater than S1;
wherein the first side gap includes a single layer of alumina and the second side gap includes a pair of layer of alumina separated from one another by a layer of non-magnetic metal.

3. A magnetic write head comprising:
a magnetic write pole having first and second laterally opposed sides and a trailing edge;
a trailing wrap around shield having a trailing portion that is separated from the trailing edge of the write pole by a non-magnetic trailing gap and having first and second side portions, the first side portion being separated from the first side of the write pole by a first side gap having a thickness S1 and the second side portion being separated from the second side of the write pole by a second side gap having a thickness S2, wherein S2 is greater than S1;
wherein the first side gap includes a single layer of alumina and the second side gap includes a pair of layer of alumina separated from one another by a layer of Ru or Rh.

4. A magnetic write head comprising:
a magnetic write pole having first and second laterally opposed sides and a trailing edge;
a trailing wrap around shield having a trailing portion that is separated from the trailing edge of the write pole by a non-magnetic trailing gap and having first and second side portions, the first side portion being separated from the first side of the write pole by a first side gap having a thickness S1 and the second side portion being separated from the second side of the write pole by a second side gap having a thickness S2, wherein S2 is greater than S1;
wherein the first side gap comprises a layer of Ru and the second side gap comprises a layer of Ru and a layer of alumina.

5. A magnetic write head comprising:
a magnetic write pole having first and second laterally opposed sides and a trailing edge;
a trailing wrap around shield having a trailing portion that is separated from the trailing edge of the write pole by a non-magnetic trailing nap and having first and second side portions, the first side portion being separated from the first side of the write pole by a first side nap having a thickness S1 and the second side portion being separated from the second side of the write pole by a second side gap having a thickness S2, wherein S2 is greater than S1;
wherein the first side gap includes a layer of alumina having a thickness of 30-90 nm, and the second side gap includes a first layer of alumina having a thickness of 30-90 nm and a second layer of alumina having a thickness of 60-200 nm.

6. A magnetic write head comprising:
a magnetic write pole having first and second laterally opposed sides and a trailing edge;
a trailing wrap around shield having a trailing portion that is separated from the trailing edge of the write pole by a non-magnetic trailing gap and having first and second side portions, the first side portion being separated from the first side of the write pole by a first side gap having a thickness S1 and the second side portion being separated from the second side of the write pole by a second side gap having a thickness S2, wherein S2 is greater than S1;
wherein the first side gap includes a layer of Ru having a thickness of 30-90 nm and the second side gap includes a layer of Ru having a thickness of 30-90 nm and a layer of alumina having a thickness of 60-200 nm.

* * * * *

UNITED STATES PATENT AND TRADEMARK OFFICE
CERTIFICATE OF CORRECTION

| | | |
|---|---|---|
| PATENT NO. | : 8,339,734 B2 | |
| APPLICATION NO. | : 12/766764 | |
| DATED | : December 25, 2012 | |
| INVENTOR(S) | : Pentek et al. | |

It is certified that error appears in the above-identified patent and that said Letters Patent is hereby corrected as shown below:

In the claims:

Column 9, line 10, please replace "thickmess" with --thickness--
Column 10, line 19, please replace "nap" with --gap--
Column 10, line 21, please replace "nap" with --gap--

Signed and Sealed this
Sixteenth Day of April, 2013

Teresa Stanek Rea
*Acting Director of the United States Patent and Trademark Office*